Dec. 5, 1939.  W. M. YEAKEL  2,182,461
BELT AND METHOD OF MAKING SAME
Filed Feb. 26, 1938
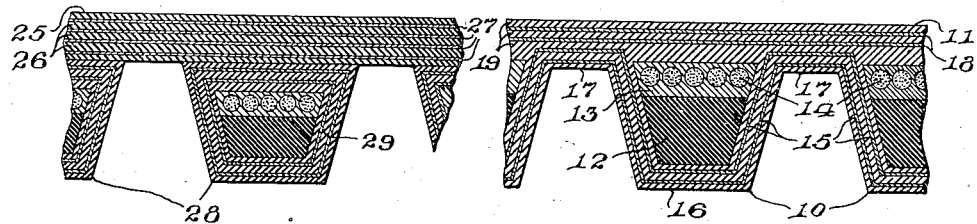
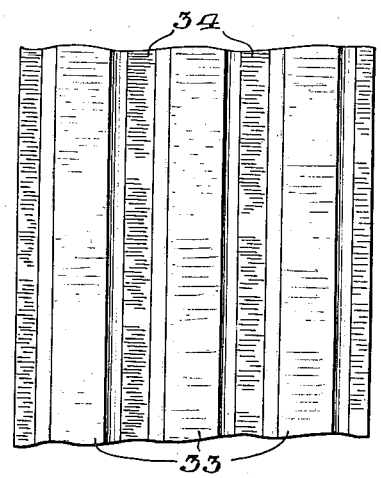
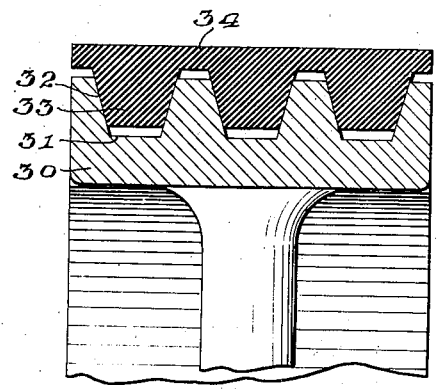
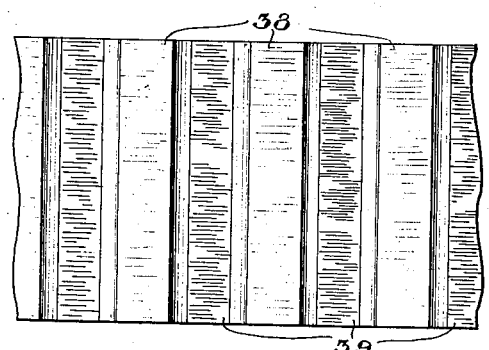
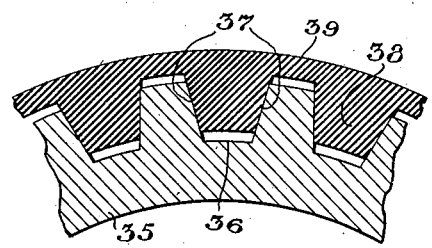
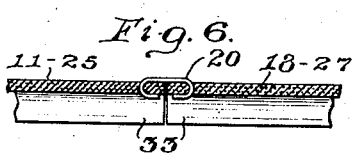
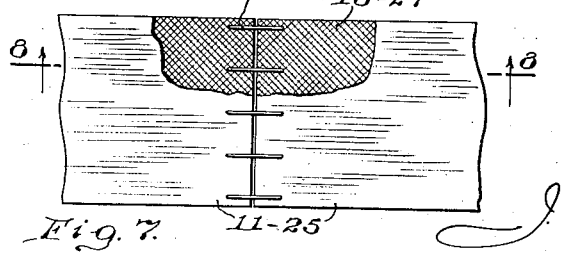
INVENTOR
William M. Yeakel
BY
J. Stuart Freeman
ATTORNEY Patented Dec. 5, 1939

2,182,461

UNITED STATES PATENT OFFICE 2,182,461

BELT AND METHOD OF MAKING SAME

William M. Yeakel, Philadelphia, Pa.

Application February 26, 1938, Serial No. 192,827

1 Claim. (Cl. 74—237)

The object of the invention is to provide improvements in V belts and the method of making same, with especial reference to so-called multiple-drive V belts.

The V belt has certain well defined structural and operating characteristics, as compared with flat belts, and when greater power transmission is involved than can be taken care of by a single V belt of standard cross section, it is customary to use a plurality of such belts, lying in and extending between parallel grooves in spaced pulleys, rather than by increasing the size of a single belt, which latter would obviously result in greatly increased weight and bulk without proportionately increasing the aggregate of the tractive surfaces, to say nothing of requiring pulley rims of much greater depth, and subjecting the belts per se to internal compressions, extensions and transverse stresses of such a degree and nature as to make the resulting belt impracticable for use with pulleys of small diameter.

By contrast, probably any two (or more) pulleys can be efficiently connected for power transmission purposes, by simply providing the necessary number of grooves of proper shape in each pulley, to receive the required number of belts of standard size and construction. However, in all such cases the several belts are entirely independent of one another, while by reason of ordinary manufacturing methods, there may occur differences in the internal construction of the several belts of such a set, especially if made by different manufacturers, with resultingly different operating characteristics, such as variations in their density, elasticity, frictional coefficients, tensile strength, et cetera.

Another object, therefore, is to provide in a single integral belt all of the desirable features of a multi-belt of the V type, but without any of the deficiencies of the multi-belt assemblies heretofore encountered; to provide a slightly modified form in which the pulley-contacting portions do not comprise sections of a single integral body, but are unitarily secured together by means of a web as hereinafter described; and to provide methods of making each of said forms.

With the objects thus briefly stated, the invention comprises further details of construction and operation, which are hereinafter fully brought out in the following description, when read in conjunction with the accompanying drawing, in which Fig. 1 is a transverse section through a fragmentary portion of a belt showing one embodiment of the invention; Fig. 2 is a similar section through a modified form of the same; Fig. 3 is a plan view of a fragmentary portion of one of the improved belts of either of the structures represented by Figs. 1 and 2 and in which the V portions extend longitudinally of the belt; Fig. 4 is a sectional view of a fragmentary portion of a grooved pulley in operative association with a belt of the type represented by Fig. 3, but without showing the details of the internal structure of the belt as in Figs. 1 and 2; Fig. 5 is a plan view of a fragmentary portion of one of the improved belts of either of the structures represented by Figs. 1 and 2, but in which the V portions extend transversely of the belt; Fig. 6 is a section of a fragmentary portion of a sprocket pulley or the like in operative association with a section of the type of belt represented by Fig. 5, but without showing the details of the internal structure of the belt, as in Figs. 1 and 2; Fig. 7 is a plan view of a fragmentary portion of the adjacent ends of a non-continuous belt of either of the types herein disclosed operatively secured together and showing a portion of each of said ends broken away so as to expose the fabric forming an internal part of the belt structure; and Fig. 8 is a section on the line 8—8 of Fig. 7, when the V portions extend longitudinally.

In considering the following description and the appended claims, it is to be understood that the terms V belt and V portions of a belt are intended to apply to any and all belts and portions of belts, respectively, which in cross section are characterized by converging surfaces, whether the central angle of the V shape is present or not, and irrespective of the angular relationship between their surfaces, or whether such surfaces are plane, curved, or irregular, either transversely or longitudinally.

Referring to Fig. 1, there is here shown a plurality of either longitudinally or transversely extending V-belt portions 10 uniting and across the rear sides of which extends a web portion 11. The core of each of the said V portions is formed in well-known manner, similar to that used when forming single V belts, and preferably comprises a forwardly extending relatively compressible core section 12 of relatively soft rubber, and a rearwardly positioned core section 13 of relatively less soft rubber, in which latter are embedded a plurality of cords 14 of any desired number, size and construction and operative to provide a high degree of tensile strength to the resulting belt structure.

This core in each case is provided with forwardly converging sides and a forward plain face which sides and face are covered by a layer of rubberized fabric or the like, vulcanized or otherwise unitarily secured to the sections of said core, which are unitarily secured to each other. Said layer of rubberized fabric may comprise either one or more internal layers of fabric 15 slightly spaced apart and both united together and protected by intervening and overlying rubber 16. This layer of rubberized fabric extends around the exposed lateral and forward surfaces of the composite core 12—13, and also across the space 17 between adjacent cores, and throughout the length of each such space becomes an integral part of the web 11, which in turn comprises a rearwardly directed layer of initially separate rubberized fabric, comprising one or more courses of fabric 18 united yet spaced apart and protected by rubber 19, which latter by means of vulcanizing or other suitable treatment coalesces with and thereafter becomes an integral rearward extension of said V portions, and at the same time provides both a transverse and a longitudinal means of integrally connecting the several V portions 10 together.

The result of this construction is to provide a unitary belt, well adapted to take the place of the so-called multi-drive power transmission units now in use, and comprising entirely independent continuous V belts which may be and frequently are made by different manufacturers, and embody varying types of construction and physical operating characteristics. By contrast, the present improved belt possesses all of the desirable characteristics of the multiple V-belt assemblies heretofore employed, so far as efficiency in power transmission is concerned, but without any of their undesirable features. Furthermore, whether the canvas duck or other fabric 18 in the web 11 is composed of longitudinal and transverse fibre elements, or is instead composed of diagonally extending transverse fibre elements, the presence of such fabric, extending in rectilinear form substantially independently of the cord-fabric-rubber structure of the V portions, provides elements for the efficient engagement of suitable fastening devices 20, which it has always been impossible heretofore to use in association with ordinary V belts, due to the fact that the individual V belts as such, and for that matter the V portions of the improved belt, are so thick and at the same time are so largely composed of relatively soft rubber, that such fastening means will not long hold under ordinary operating conditions. This deficiency is also due to the fact that, while elongation of the wider rear portion of a V belt is prevented by the longitudinal cords 14, the narrower forward portion of such a belt alternately compresses and expands far differently from the said rear portion of such belt, as the latter passes around the periphery of a pulley, especially when such pulley is of relatively small diameter, and having in mind that such passage around a pulley may and frequently does occur at the rate of many hundreds of times per minute. By extending the fastening means 20 only through the fabric-containing web portion 11 and between adjacent V portions 10, such fastening means connect together portions of the improved belt, which do not come into direct contact with any portion of a pulley surface, and which are not subject to extreme changes in shape arising from extreme flexing and alternate compression and expansion, due to the fact that the web itself is of relatively shallow thickness, and contains preferably as many as four or more internal layers of fabric closely associated with one another, and thus also contributing to a substantially non-elastic web structure, which is relatively unyielding in its normal plane, while the layers 18 of fabric in the web preferably comprise lateral projections or continuations of the layers 15 in the V portions, and may overlap if desired.

Referring to Fig. 2, there is here shown a modified form of unitary belting in which a web 25 is provided, the same comprising alternate layers of rubber 26 and intervening fabric 27, the ends of which web may be secured together by the fastening means 20, as shown in Fig. 7. However, in this case there is secured to said web by vulcanizing, or other suitable means, spaced parallel portions of V belting 28, the core of each such portion being substantially as that hereinbefore described, but being completely surrounded by a covering 29 of rubberized fabric, such fabric thus extending along the two opposite forwardly converging sides, and across the relatively narrower front face and the relatively wider rear face of said core. This type of belt is adapted for such cases as those in which it may for some reason be difficult to form the V portions 28 and the web 25 at the same time, or in the same mold, as is required in order to form the type shown in Fig. 1. However, such modified form of belt is well adapted for use under certain conditions, especially when the V portions 28 extend longitudinally of the belt as shown in Fig. 3, as in such case there is relatively little if any strain placed upon the plane of union between the said V and web portions, at least as compared with the condition existing when the said V portions extend transversely of the belt, as shown in Fig. 5, and which latter are employed in conjunction with sprocket wheels such as that shown in Fig. 6, as compared with the parallel grooved pulley represented by Fig. 4.

Referring specifically to Fig. 4, a pulley is here shown as comprising a rim 30, provided with spaced grooves 31, the opposite sides 32 of which taper so as to properly receive the correspondingly opposite sides of the V portions 33 of the belt, in which said V portions are either integrally or merely unitarily united by means of a web portion 34. By comparison, the sprocket wheel of Fig. 6 comprises a rim 35 provided circumferentially with transversely extending grooves 36, providing inwardly converging side walls 37 into which tend to wedge the corresponding laterally opposite surfaces of V portions 38, either integrally or merely unitarily connected together by a web portion 39.

Such a belt as that herein described provides a marked improvement in the art, and it is to be understood that the broad principles of its construction and operation contemplate any and all alterations or variations which may fall within the scope of the appended claim.

Having thus described my invention, what I claim as new and desire to protect by Letters Patent of the United States is:

A belt, comprising a plurality of V portions, and a web portion containing laminated rubber and fabric extending in a transverse plane and integrally connecting said V portions together, said V and web portions also being characterized by common courses of laminated fabric and rubber adjacent to their pulley-engageable surfaces.

WILLIAM M. YEAKEL.